US00RE42789E

(19) United States
(12) Reissued Patent
Miller

(10) Patent Number: US RE42,789 E
(45) Date of Reissued Patent: Oct. 4, 2011

(54) METHOD FOR TESTING A COMMUNICATION CHANNEL

(75) Inventor: William Lee Miller, Topeka, KS (US)

(73) Assignee: AT&T Intellectual Property I, L.P., Atlanta, GA (US)

(21) Appl. No.: 10/879,891

(22) Filed: Jun. 29, 2004

Related U.S. Patent Documents

Reissue of:
(64) Patent No.: 6,418,160
Issued: Jul. 9, 2002
Appl. No.: 09/537,830
Filed: Mar. 29, 2000

(51) Int. Cl.
*H04B 1/38* (2006.01)
*H04B 3/30* (2006.01)
*H04M 1/24* (2006.01)

(52) U.S. Cl. ..... 375/222; 370/285; 379/27.01

(58) Field of Classification Search ..... 375/219, 375/220, 22, 224, 257, 377, 222, 225, 227, 375/259; 370/241, 281, 285; 379/12, 26.01, 379/22, 27.01, 32.04, 27.03, 27.04, 399.01, 379/400, 414, 415
See application file for complete search history.

(56) References Cited

U.S. PATENT DOCUMENTS

| | | | | |
|---|---|---|---|---|
| 4,756,007 | A | 7/1988 | Qureshi | |
| 5,048,054 | A | 9/1991 | Eyuboglu et al. | |
| 5,140,625 | A | 8/1992 | Reum et al. | |
| 5,202,905 | A | 4/1993 | Sakamoto et al. | |
| 5,425,052 | A | 6/1995 | Webster et al. | |
| 5,500,879 | A | 3/1996 | Webster et al. | |
| 5,504,736 | A | 4/1996 | Cubbison, Jr. | |
| 5,515,398 | A | 5/1996 | Walsh et al. | |
| 5,671,250 | A | 9/1997 | Bremer et al. | |
| 5,715,277 | A | 2/1998 | Goodson et al. | |
| 5,726,765 | A | 3/1998 | Yoshida | |
| 5,802,446 | A | 9/1998 | Giorgi et al. | |
| 5,870,429 | A | 2/1999 | Moran, III et al. | |
| 5,982,768 | A | 11/1999 | Bellenger et al. | |
| 6,091,713 | A * | 7/2000 | Lechleider et al. | 370/248 |
| 6,212,229 | B1 * | 4/2001 | Salinger | 375/224 |
| 6,295,313 | B1 | 9/2001 | Noma et al. | |

(Continued)

FOREIGN PATENT DOCUMENTS

| | | |
|---|---|---|
| WO | WO 99/53637 | 10/1999 |
| WO | WO 99/53647 A | 10/1999 |

OTHER PUBLICATIONS

Kumar et al., Publication No. US 2001/0040917 A1, Pub. Date: Nov 5, 2001.

(Continued)

*Primary Examiner* — Young T. Tse
(74) *Attorney, Agent, or Firm* — Toler Law Group

(57) ABSTRACT

A method of evaluating the characteristics of a subscriber loop associated with a customer modem comprises the steps of receiving line probing data from the modem and analyzing the line probing data to determine the circuit characteristics of the subscriber loop which relate to communication rate performance. The method generates a gain slope value as a function of the line probing data which is indicative of the length of the subscriber loop. The method also generates a loaded slope value as a function of the line probing data which is indicative of an inductive load on the subscriber loop. The method also generates an A/D value as a function of the line probing data which is indicative of an analog-to-digital and digital-to-analog conversion on the subscriber loop. The method then outputs an expected communication rate for the subscriber loop as a function of the gain slope, loaded slope, and A/D values, thereby providing a circuit analysis of the customer subscriber loop.

5 Claims, 2 Drawing Sheets

U.S. PATENT DOCUMENTS

| | | | | |
|---|---|---|---|---|
| 6,426,946 | B1 * | 7/2002 | Takagi et al. | 370/252 |
| 6,546,090 | B1 * | 4/2003 | Bremer et al. | 379/93.08 |
| 6,650,697 | B1 * | 11/2003 | Tate et al. | 375/222 |
| 6,724,890 | B1 * | 4/2004 | Bareis | 379/394 |
| 6,765,955 | B1 * | 7/2004 | Davis et al. | 375/222 |
| 2001/0040917 | A1 * | 11/2001 | Kumar et al. | 375/219 |

OTHER PUBLICATIONS

Communication Pursuant to Article 96(2) EPC, Jun. 26, 2006, International Application No. 01924405.2, European Patent Office (8 pgs).

Communication Pursuant to Article 96(2) EPC, Nov. 15, 2007, International Application No. 01924405.2, European Patent Office (3 pgs).

International Search Report for International Application No. PCT/US01/09957, Mailed on Jul. 27, 2001.

International Preliminary Examination Report for International Application No. PCT/US01/09957, Mailed on Feb. 13, 2003.

Office Action for Canadian Patent Application No. 2,403,657 dated Aug. 11, 2010, 5 pp.

* cited by examiner

METHOD FOR TESTING A COMMUNICATION CHANNEL

Matter enclosed in heavy brackets [ ] appears in the original patent but forms no part of this reissue specification; matter printed in italics indicates the additions made by reissue.

*The present application is an application for reissue of U.S. Pat. No. 6,418,160 B1, entitled "Method for Testing a Communication Channel", which has original U.S. application Ser. No. 09/537,830.*

TECHNICAL FIELD

The present invention relates generally to a method for testing a communication channel and, more particularly, concerns a communication system that uses modern line probing data in an evaluation method to determine the circuit characteristics of a customer subscriber loop.

BACKGROUND OF THE INVENTION

Numerous personal computers are connected to other computer systems or to computer networks such as the Internet through the public switched telephone network (PSTN). A common way of connecting a computer to the PSTN for communication with other computers or computer networks is through the use of a modem. Most modems are capable of operating at different transmission rates at different times, and have a typical maximum communication rate of 56 kbps.

Generally, both the transmitting modem and the receiving modem must evaluate the communication channel first in order to optimize the performance. One way of achieving this is, during "handshaking," to have the transmitting modem transmit, as part of its set-up sequence to the receiving modem, a composite signal which will be recognized by the receiving modem. This allows the receiving modem to evaluate the communication channel and condition itself to have an optimized data rate for this connection. Modems operating under the V.34 and V.90 standards perform such line probing to maximize the data communication rate.

The maximum communication rate that a modem can achieve is related to the hardware or circuit characteristics associated with a particular customer subscriber loop. The subscriber loop is the twisted copper pairs of wires running to a home or a business from the telephone Central Office switching system. The physical characteristics of a particular subscriber loop may effectively limit the transmission rate for a particular customer. There are numerous other problems, however, unrelated to the physical characteristics of the customer subscriber loop, which can degrade communication performance resulting in lower modem transmission rates. Therefore, for customers experiencing degraded modem performance, there is a need for determining whether the characteristics of the customer subscriber loop is responsible for the degraded modem performance.

Presently, a telephone company technician must be dispatched to the particular customer location with special testing equipment to determine the characteristics of the customer subscriber loop. Troubleshooting customer modem transmission problems by dispatching technicians is expensive and time consuming. Accordingly, what is needed is an inexpensive and remotely located system and method for testing subscriber loop characteristics for a particular customer.

BRIEF DESCRIPTION OF THE DRAWINGS

For a more complete understanding of this invention, reference should now be had to the embodiments illustrated in greater detail in the accompanying drawings described below by way of examples of the invention. In the drawings.

DETAILED DESCRIPTION OF THE PREFERRED EMBODIMENT(S)

Figure 1:
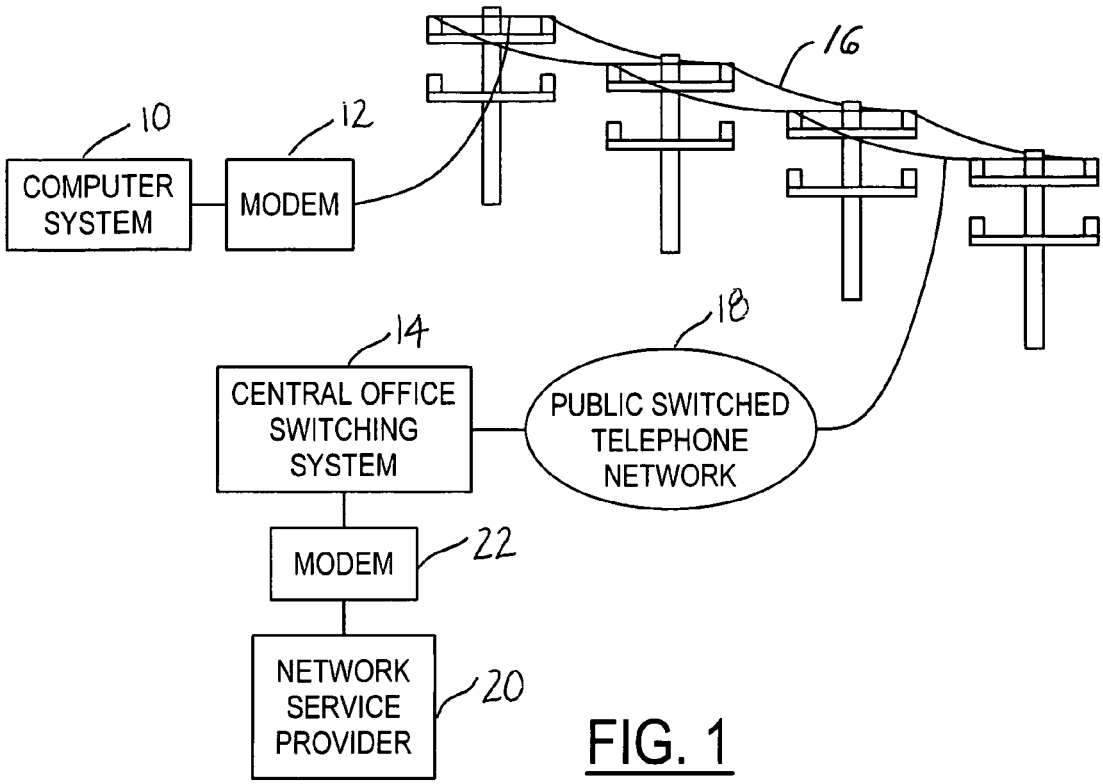
FIG. 1 is a schematic block diagram of one embodiment of the present invention in the environment of the public switched telephone network.

FIG. 1 shows a schematic block diagram illustrating one example of a modem connection between a customer location and a network service provider in accordance with an aspect of the present invention. In this example, the customer location includes a computer system 10 which represents any type of computer system capable of receiving and transferring data. This includes computer systems such as a personal computer or a network server. The computer system 10 is connected to a data modem 12 which may be built into the computer system 10 or exist independently from the computer system 10. Modem 12 is a conventional data modem operating at frequencies below 4000 Hz such as a V.34 or V.90 type modem. The modem 12 is connected to the Central Office switching system 14 by a subscriber loop 16. Each subscriber loop 16 for a particular customer comprises pairs of twisted wires running from the customer location, such as a home or business, to the telephone Central Office switching system 14 by way of the Public Switched Telephone Network (PSTN) 18. The PSTN 18 routes and carries telephone signals between a plurality of different Central Office switching systems.

In this example, the customer modem 12 is connected to modem 22 of the network service provider 20 for subscriber line evaluation. The network service provider 20 represents, for example, the customer's local phone company. Alternatively, the network service provider 20 could be an ISP providing access to the Internet. The modem 22 associated with the network service provider 20 is also, preferably, a conventional modem operating at frequencies below 4000 Hz, such as a V.34 or V.90 type modem. Alternatively, the modem 22 can be a modem having an all-digital interface.

Because the subscriber loop represents the physical connection between a customer premises and another computer system or network, it will likely be different for each customer. Each subscriber loop may have any of several characteristics or circuit elements that can effectively limit the modem communication rates available for that customer. In particular, the physical distance the communication signals must travel along the twisted pair of wires directly affects signal strength. Due to capacitive reactance in the line, signal strength becomes attenuated as the distance increases. To counteract these losses, the lines must be "loaded" with an inductive reactance. The loaded line, however, has the characteristics of a low pass filter with significant signal attenuation above 3000 Hz.

In addition to the loaded or unloaded condition of a particular subscriber loop, the subscriber loop may include one or more analog-to-digital (A/D) conversions. Portions of the subscriber loop may be connected through a digital network such as a digital loop carrier network. Data transmissions across such a digital network require A/D conversions to convert the analog modem signals to digital data for transmission across the digital network and vice-versa. Most of the switching equipment associated with the PSTN digitizes analog signals on subscriber loops by sampling the analog signals at a frequency of 8 kHz. Because of the Nyquist limit, this sampling rate imposes a maximum frequency of 4 kHz that can be sampled and passed from a subscriber loop through a PSTN. Accordingly, there is signal attenuation associated with frequencies above approximately 3400 Hz to account for the effects of A/D conversions along a subscriber loop.

The customer subscriber loop may also connect between two load points or contain a loaded bridge tap. In either case, the subscriber loop will have the characteristics of a notch filter. This would significantly degrade the customer modem performance and require modifications to the subscriber loop by telephone company service personnel to improve performance.

These subscriber loop characteristics—short loop/long loop, loaded/non-loaded, number of A/D conversions, notch filter—all affect the maximum possible transmission rate associated with a customer's modem such as modem 12. The method of the present invention tests for these subscriber loop characteristics and provides an output of the expected transmission rates for a particular customer subscriber loop.

Figure 2:
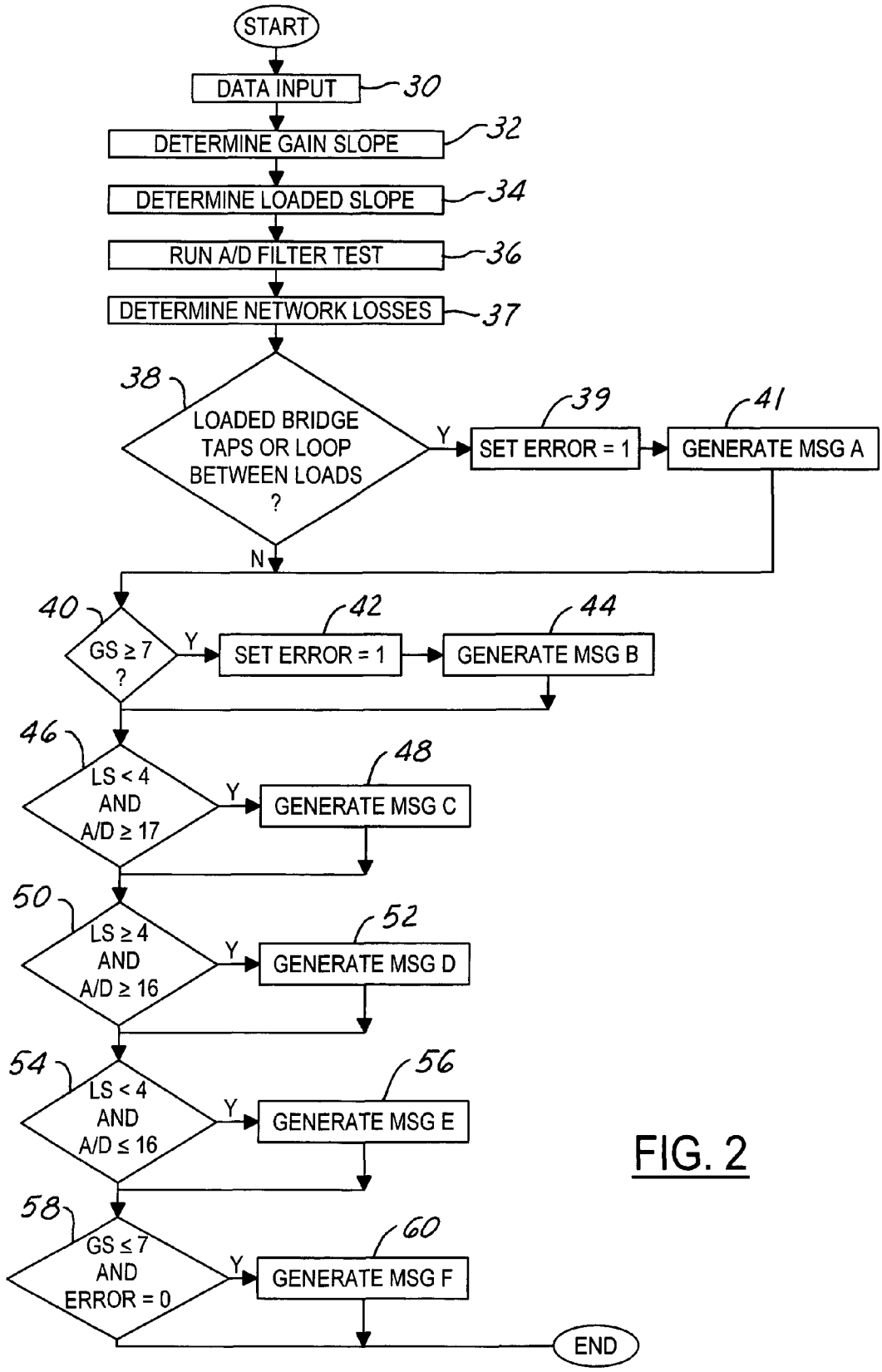
FIG. 2 is a logic flow diagram of one embodiment of the method for testing a communication channel.

FIG. 2 shows a logic flow diagram of one embodiment of the present method for evaluating customer subscriber loop characteristics. Referring to FIG. 2, the line probing data associated with the customer modem 12 is input in step 30 for evaluation. As mentioned above, prior to establishing a communication link, the modem 12 will perform a handshaking and initialization routine to establish the maximum communication rate between the modem 12 and the desired computer system or network. This line probing data can be extracted and used as described with reference to FIG. 2 to determine the circuit characteristics of the subscriber loop 16. One method of extracting this line probing data is discussed below with reference to FIG. 3.

Continuing with FIG. 2, as part of step 30, it is preferable to analyze the format of the line probing data to insure that it is in the proper sequence and format for evaluation as described with respect to the following steps. The line probing data preferably provides frequency versus attenuation data between approximately 150 Hz and 3750 Hz. This line probing data is a feature of all V.34 and V.90 type modems.

In step 32, the gain slope of the subscriber loop is evaluated and stored. This is accomplished by subtracting the level of the signal strength at 1050 Hz from the level of signal strength detected at 3000 Hz. This value is stored as the gain slope (GS) value. The loaded slope evaluator is then executed in step 34. This is accomplished by analyzing the line probing data and subtracting the signal level at 2850 Hz from the signal level at 3300 Hz. This value is stored as the loaded slope (LS) value. The A/D filter test is performed in step 36. The A/D value (A/D) is stored as the difference between the signal level at 2850 Hz and the signal level at 3750 Hz.

In step 37, the subscriber loop evaluation routine calculates the loss associated with the network. This is accomplished by subtracting 10 dB from the signal level measured at 1050 Hz.

Once the line probing data has been entered and the initial values determined, steps 38-54 perform a series of tests to determine the subscriber loop characteristics which may affect the customer modem transmission rates. In step 38, the subscriber loop is analyzed to determine whether the loop has loaded bridge taps or is working between loads. This is accomplished by determining whether there is signal attenuation greater than 4 dB at any data point between 1250 Hz and 2850 Hz. If a valley of 4 dB or more is detected at any of these frequencies, the routine sets an error flag at step 39 and generates a system message at step 41 indicating that the subscriber loop has a loaded bridge tap or is operating between two loads (MSG A).

In step 40, the routine analyzes whether the gain slope as determined in step 32 is greater than or equal to 7. If so, the error flag is set in step 42, and a system message is generated in step 44 indicating that this particular subscriber loop needs to be loaded (MSG B). In other words, if GS is greater than or equal to 7, the customer subscriber loop is a long loop requiring an inductive load to balance the capacitive losses associated with the long loop. If the error flag is set in either step 39 or 42, it indicates that the customer is likely to experience significantly degraded modem performance. In such cases, modification to the subscriber loop will be required to improve performance.

In step 46, the routine determines whether the loaded slope is less than four and the A/D value is greater than or equal to 17. If these conditions are satisfied, the system generates a message (MSG C) in step 48 indicating that there are two or more A/D conversions in the subscriber loop. Given this condition, the expected modem communication rate is between 19.2 kbps to 26.4 kbps.

In step 50, if the loaded slope value is greater than or equal to 4 and the A/D value is greater than or equal to 16, the system generates a message (MSG D) in step 52 indicating that the subscriber loop is loaded, and that the expected modem communication rate is between 19.2 kbps to 24 kbps. Otherwise, the routine continues to step 54.

In step 54, if the loaded slope value is less than 4 and the A/D value is less than or equal to 16, the system generates a message (MSG E) in step 56 indicating that the subscriber loop is non-loaded and that the expected modem communication rate is between 40 kbps to 53 kbps. Otherwise, the routine continues to step 58.

In step 58, it is determined whether the gain slope value is less than or equal to 7 and no error flag has been set. If this condition is met, the system generates a message (MSG F) in step 60 indicating that all loaded and non-loaded requirements have been met and the expected modem communication rate is the maximum possible modem rate for that loaded or non-loaded condition.

With the subscriber loop evaluation method of FIG. 2, a technician located remotely from the customer site can determine if the subscriber loop meets standard transmission design criteria without the need to visit the customer premises. The technician may be located, for example, at the network service provider 20 such as the local phone company. From this location, the technician can determine if the customer's modem 12 is performing at its optimum connection speed. By evaluating the characteristics of the subscriber loop, the evaluation method provides the technician with a predicted modem communication rate for the customer and indicates whether the subscriber loop needs modification to improve modem performance.

With the evaluator method as described in FIG. 2, the user can determine if the subscriber loop is loaded or non-loaded and, if non-loaded, whether the loop should be loaded to improve transmission performance. If the subscriber loop is loaded, the method also indicates an expected connection rate for the loaded subscriber loop. In addition, the evaluation method determines if there are loading errors in the subscriber loop such as loaded bridge taps. Further, the evaluation method determines if there are two or more A/D conversions within the calling path, and indicates the expected connection rates if such conversions exist.

The evaluation method is advantageous in that it allows customers with perceived modem connection problems to analyze their unique subscriber loop and determine whether the loop characteristics are responsible for degrading modem performance. In this case, only if an error flag is set would it be necessary to dispatch telephone company personnel to modify the subscriber loop characteristics to alleviate the performance problem. In all other cases, the actual modem performance should be within the range of the expected communication rate as indicated by the evaluation method. If the actual communication rate is different than the expected communication rate, than it can be concluded that the problem is something other than the subscriber loop configuration. For example, the modem software may be set up incorrectly or the customer's ISP may not support higher modem communication rates.

Figure 3:
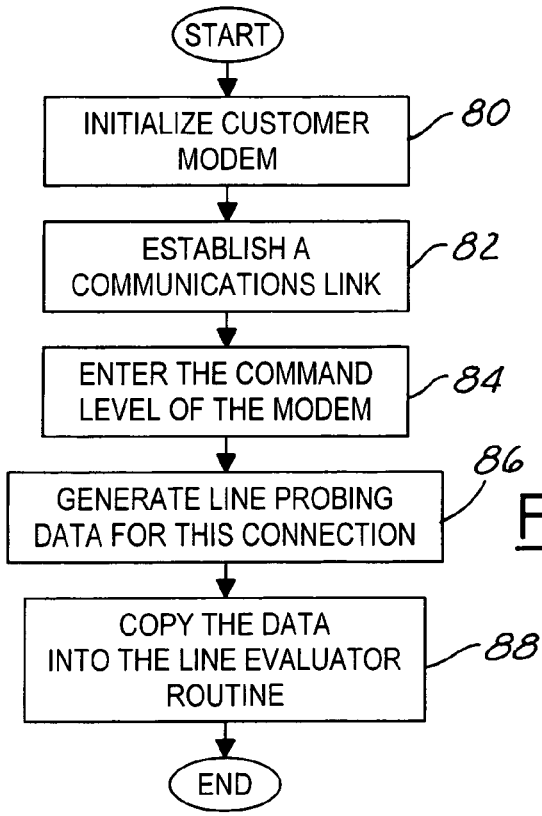
FIG. 3 is a logic flow diagram showing one embodiment of implementing the method according to FIG. 2.

FIG. 3 shows a logic flow diagram of one method of generating customer modem line probing data for input (at step 30) into the line evaluation method of FIG. 2. In this example, a customer has contacted the technical support department of their local phone company to address a modem connection speed issue. A customer may have a personal computer equipped with a V.34 or V.90 type modem capable of operating at connection speeds up to 56 kbps, for example. To analyze the subscriber loop remotely, the technical support department of the local telephone company will require a computer system equipped with a modem such as a V.34 or V.90 type modem offered by U.S. Robotics connected to a POTS line. To eliminate the possibility of introducing circuit characteristics unassociated with the customer subscriber loop, it is preferable that the remote computer system be located in a Central Office less than 500 feet from the primary switch. The remote testing configuration would, therefore, look like the system shown in FIG. 1 wherein the network service provider 20 is the technical support department of the local phone company.

Referring again to FIG. 3, a terminal program is used by the remote technician and the customer whose line is under test to gather the modem line probing data for evaluation. The terminal program can be, for example, Hyperterminal, which is part of the Microsoft Windows 95/98 Operating System, or an equivalent.

Beginning at step 80, the technician communicates with the customer and instructs the customer of the steps necessary to establish a Hyperterminal session and set up the customer modem to auto-answer. In step 82, the technician, through his personal computer by way of the Hyperterminal session, calls the customer's modem line and establishes a communications link. At this point, the customer's computer system is set up as a Hyperterminal session and auto-answers the incoming call from the technician's modem. Once a communications link has been established, the technician enters the command level of his modem in step 84. This can be accomplished in modems manufactured by U.S. Robotics by typing "+++". The modem responds with "OK" to verify that communications are at the command level. At this prompt, the technician enters "ATY11" to display the line probing data for the present modem connection. This is shown in step 86. In step 88, the line probing data can be copied such as by, for example, using the cut or copy functions of the Microsoft Windows Operating System. The modem connection can then be terminated and the line evaluator routine can then be executed, with the line probing data entered in step 30 as described above with reference to FIG. 2. Specifically, preferably, the line probing data is "pasted" into the evaluation routine at the data input prompt.

In another embodiment, it is contemplated that the modem line evaluation method such as shown in FIG. 2 is executed automatically at the initiation of a customer. In this case, the line probing data gathering is performed by the customer, as well as the line evaluation routine. For example, the customer would receive instructions over the phone via an automated message system or via the Internet for initializing the customer modem as shown in step 80 of FIG. 3. The customer would then dial into the network to establish a communications link as in step 82. Once the communications link is established, the customer would then enter the appropriate commands to generate the line probing data for the customer's subscriber loop, and enter the data into the subscriber loop evaluator routine. The subscriber loop evaluator routine would be available, for example, either as an Internet web-based application, or as part of the software available with the customer modem 12. In the latter case, the modem 12 would include a control processing unit such as microprocessor programmed to perform the steps of the evaluation method as shown, for example, in FIG. 2. In addition, if the evaluation routine was included as part of the customer modem software, it could also be self-executing at the input of a predetermined command. In either case, the system response of the subscriber loop evaluator routine would then enable the customer to analyze their particular subscriber loop characteristics and be informed of the expected communication data rates. This embodiment has the additional advantage of eliminating the need to contact the customer's local phone company if the actual communication rates are within the expected communication rates generated by the line evaluator method of the present invention. This allows the customer to readily determine, or eliminate from consideration, the source of possible modem performance degrading problems.

In another embodiment, it is contemplated that the subscriber loop evaluation routine is contained within portable devices used by telephone company personnel remotely from the Central Office location. In this way, technicians in the field could readily analyze subscriber loop characteristics of a particular customer's line from any location including the customer premises.

From the foregoing, it can be seen that there has been brought to the art a new and improved method for testing a communication channel. The present method has the advantage of eliminating the time and expense associated with dispatching telephone company personnel to a customer location to evaluate the subscriber loop characteristics for a particular customer. While the invention has been described in connection with one or more embodiments, it should be understood that the invention is not limited to those embodiments. On the contrary, the invention covers all alternatives, modifications, and equivalents, as may be included within the spirit and scope of the appended claims.

What is claimed is:

[1. A method of evaluating a modem-linked communication channel comprising:

receiving line probing data from said modem;

generating a first line value as a function of said line probing data, said first line value relating to a first circuit characteristic of said communication channel;

determining a loaded slope value of said communication channel by calculating said line probing data and subtracting the signal strength of said communication channel at 2850 Hz from the signal strength of said communication channel at 3300 Hz;

indicating the load status of said communication channel as a function of said loaded slope value; and outputting a message as a function of said first line value, said message being indicative of the first circuit characteristic of said communication channel.]

[2. The method of claim 1 further comprising determining an A/D value of said communication channel by calculating the difference between the signal strength of said communication channel at 2850 Hz and the signal strength of said communication channel at 3750 Hz, and the step of outputting the message includes indicating whether an A/D and a D/A conversion are present in said communication channel as a function of said loaded slope value and said A/D value.]

[3. A method of evaluating a modem-linked communication channel comprising:

receiving line probing data from said modem;

generating a first line value as a function of said line probing data, said first line value relating to a first circuit characteristic of said communication channel;

generating a notch filter value of said communication channel as a function of said line probing data;

indicating a reduced communication rate for said communication channel as a function of said notch filter value; and outputting a message as a function of said first line value, said message being indicative of the first circuit characteristic of said communication channel.]

[4. A method of evaluating the characteristics of a subscriber loop associated with a customer modem, the method comprising:

receiving line probing data from said customer modem;

generating a gain slope value as a function of said line probing data, said gain slope value being indicative of the length of said subscriber loop;

generating a loaded slope value as a function of said line probing data, said loaded slope value being indicative of an inductive load on said subscriber loop;

generating an A/D value as a function of said line probing data, said A/D value being indicative of an analog-to-digital and digital-to-analog conversion on said subscriber loop; and outputting an expected communication rate for said subscriber loop as a function of said gain slope, loaded slope, and A/D values.]

[5. The method of claim 4 further comprising generating a notch filter value as a function of said line probing data, said notch filter value being indicative of a predetermined amount of signal attenuation at a predetermined frequency on said subscriber loop; and outputting the expected communication rate for said subscriber loop as a function of said notch filter value.]

[6. The method of claim 4 wherein generating the gain slope value includes subtracting the signal strength of said subscriber loop at 1050 Hz from the signal strength of said subscriber loop at 3000 Hz, and when said gain slope value is greater than or equal to approximately 7 dB, outputting the expected communication rate includes indicating the length of said subscriber loop as the function of said gain slope value.]

[7. The method of claim 6 wherein generating the loaded slope value includes subtracting the signal strength of said subscriber loop at 2850 Hz from the signal strength of said subscriber loop at 3300 Hz.]

[8. The method of claim 7 wherein generating the A/D value includes subtracting the signal strength of said subscriber loop at 2850 Hz from the signal strength of said subscriber loop at 3750 Hz; and when said loaded slope value is less than 4 dB, said A/D value is greater than or equal to 17 dB and the expected communication rate is between 19.2 kbps and 26.4 kbps, and when said loaded slope value is less than 4 dB, said A/D value is greater than or equal to 16 dB and the expected communication rate is between 19.2 kbps and 24.0 kbps, and when said loaded slope value is less than 4 dB, said A/D value is greater than or equal to 16 dB and the expected communication rate is between 40 kbps and 53 kbps.]

[9. The method of claim 4 wherein receiving the line probing data from said customer modem includes:

establishing a communications link between said customer modem and a terminal associated with a network service provider by way of said subscriber loop;

entering a command level of said customer modem such that said customer modem will respond to a predetermined command; and transmitting said predetermined command from said terminal to said customer modem to display said line probing data on said terminal.]

[10. The method of claim 4 wherein receiving the line probing data from said customer modem includes:

establishing a communications link between said customer modem associated with a terminal and a network service provider by way of said subscriber loop;

entering a command level of said customer modem such that said customer modem will respond to a predetermined command; and transmitting said predetermined command from said terminal to said customer modem to display said line probing data on said terminal.]

[11. A modem adapted to receive line probing data comprising signal frequency versus attenuation data and evaluate the characteristics of a subscriber loop, said modem comprising a microprocessor programmed to perform the following steps:

generating a gain slope value indicative of the length of said subscriber loop associated with said modem;

generating a loaded slope value as a function of said line probing data, said loaded slope value being indicative of an inductive load on said subscriber loop;

generating an A/D value as a function of said line probing data, said A/D value being indicative of an analog-to-digital and digital-to-analog conversion on said subscriber loop; and outputting an expected communication rate for said subscriber loop as a function of said gain slope, loaded slope, and A/D values.]

[12. A modem adapted to receive line probing data comprising signal frequency versus attenuation data and evaluate the characteristics of a subscriber loop, said modem comprising a microprocessor programmed to perform the following steps:

generating a first value as a function of said line probing data, said first value corresponding to a circuit characteristic of said subscriber loop associated with said modem;

generating a notch filter value as a function of said line probing data, said notch filter value being indicative of a predetermined amount of signal attenuation at a predetermined frequency on said subscriber loop; and outputting an expected communication rate for said subscriber loop as a function of said notch filter value.]

*13. A method of determining a subscriber loop characteristic, comprising:*

*acquiring frequency versus attenuation data associated with a subscriber loop; and*

*determining a subscriber loop condition using a modem in response to attenuation values associated with a predetermined frequency range from the frequency versus the attenuation data,*

*wherein the subscriber loop condition comprises a condition other than a loaded loop condition or an unloaded loop condition,*

*wherein the subscriber loop condition comprises a loaded bridge tap condition,*

*wherein the predetermined frequency range associated with the loaded bridge tap condition extends from approximately 1250 Hz to approximately 2850 Hz, and*

*wherein an attenuation greater than 4 dB within the predetermined frequency range is indicative of the loaded bridge tap condition.*

*14. The method of claim 13, wherein the frequency versus the attenuation data includes line probe data associated with the modem.*

*15. The method of claim 13, wherein the frequency versus the attenuation data is received from the modem coupled to the subscriber loop.*

*16. A device comprising:*

*a processor adapted to:*

*acquire frequency versus attenuation data associated with a subscriber loop; and*

*analyze the frequency versus the attenuation data to perform an unloaded long loop condition test, a loaded loop condition test, a plurality of A/D conversions condition test, and a loaded bridge tap condition test,*

*wherein a subscriber loop condition of the subscriber loop comprises a loaded bridge tap condition,*

*wherein a predetermined frequency range associated with the loaded bridge tap condition extends from approximately 1250 Hz to approximately 2850 Hz, and*

*wherein an attenuation greater than 4 dB within the predetermined frequency range is indicative of the loaded bridge tap condition.*

*17. The device of claim 16, wherein the device is a modem coupled to the subscriber loop and wherein the frequency versus the attenuation data includes line probe data.*

* * * * *